United States Patent
Amdahl et al.

(10) Patent No.: US 8,612,374 B1
(45) Date of Patent: Dec. 17, 2013

(54) METHODS AND SYSTEMS FOR READ AHEAD OF REMOTE DATA

(75) Inventors: Saxon Amdahl, Mountain View, CA (US); Vinod Jayaraman, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 938 days.

(21) Appl. No.: 12/623,579

(22) Filed: Nov. 23, 2009

(51) Int. Cl.
*G06F 1/00* (2006.01)
*G06F 15/18* (2006.01)

(52) U.S. Cl.
USPC .............. 706/21; 701/117; 701/118; 705/400

(58) Field of Classification Search
USPC .......................................................... 706/21
See application file for complete search history.

(56) References Cited

U.S. PATENT DOCUMENTS

| | | | |
|---|---|---|---|
| 5,588,128 A | 12/1996 | Hicok et al. | |
| 5,809,560 A | 9/1998 | Schneider | |
| 5,940,838 A | 8/1999 | Schmuck et al. | |
| 6,070,230 A | 5/2000 | Capps | |
| 6,385,624 B1 | 5/2002 | Shinkai | |
| 6,915,404 B1 | 7/2005 | Desai et al. | |
| 7,120,753 B2 | 10/2006 | Accapadi et al. | |
| 7,181,457 B2 | 2/2007 | Reinauer et al. | |
| 7,203,815 B2 | 4/2007 | Haswell | |
| 2004/0098538 A1 | 5/2004 | Horn et al. | |
| 2005/0063307 A1 | 3/2005 | Samuels et al. | |
| 2005/0144394 A1 | 6/2005 | Komarla et al. | |
| 2005/0154825 A1 | 7/2005 | Fair | |
| 2006/0271740 A1 | 11/2006 | Mark et al. | |
| 2007/0005904 A1 | 1/2007 | Lemoal et al. | |
| 2007/0094452 A1 | 4/2007 | Fachan | |
| 2007/0106849 A1 | 5/2007 | Moore et al. | |
| 2008/0040538 A1 | 2/2008 | Matsuzawa et al. | |
| 2009/0138420 A1* | 5/2009 | Swift et al. | 706/21 |
| 2009/0144130 A1* | 6/2009 | Grouf et al. | 705/10 |

OTHER PUBLICATIONS

Goglin et al., "Performance Analysis of Remote File System Access Over a High-Speed Local Networks", IEEE, pp. 1-8 (2004).
Kurmann et al.,"A Comparison of Two Gigabit SAN/LAN Technologies: Scalable Coherent Interface Versus Myrinet", Laboratory for Computer Systems Swiss Institute of Technology, pp. 1-12 (1998).
Agrawala, "Operating Systems", Operating System Concepts, pp. 1-25 (2004).

* cited by examiner

*Primary Examiner* — Kakali Chaki
*Assistant Examiner* — Kalpana Bharadwaj
(74) *Attorney, Agent, or Firm* — LeClairRyan, A Professional Corporation

(57) ABSTRACT

A method, computer readable, and apparatus for read-ahead prediction of subsequent requests to send data between a client coupled to a server via a network includes receiving at a traffic management device a request for a part of at least one of a data file and metadata. The traffic management device selects from two or more of a sequential prediction engine, an expert prediction engine and a learning prediction engine to predict a read-ahead of the at least one of the data file and metadata. One or more additional read-ahead parts of the at least one of the data file and metadata are determined with the traffic management device based on the selecting.

21 Claims, 5 Drawing Sheets

METHODS AND SYSTEMS FOR READ AHEAD OF REMOTE DATA

FIELD

This invention generally relates to remote data transfer over networks and more particularly, to a method and system for efficient read-ahead to maximize efficiencies of remotely transferring data.

BACKGROUND

With the widespread use of wide area network based applications, transmitting larger amounts of data from servers networked with requesting clients is necessary. Such files are typically obtained via remote access from the server via the wide area network between the requesting client and the server. Concerns have been raised with time delay in receiving a transfer of large amounts of data between networked computers.

Based on current network data transfer protocols such as the Common Internet File Sharing (CIFS) protocol or the Network File Sharing (NFS) protocol, data requests are typically broken up into different requests to send smaller increments of the data due to these local area network protocols for file transfer that are adapted to wide area networks. In such a situation, the client requesting the data will issue a single request for the first part of the requested file and wait for the receipt of the first part of the data. The client will then issue a subsequent request and wait for the receipt of the subsequent data and so forth until the entire data is received. The numerous requests across the network for large files create a long latency time to receive a requested file. In smaller, local area networks, such latency time between requests and sending data is small. However, in larger networks requiring remote access of files across long distances, the latency times increase and interfere with the efficient transfer of data over the network.

One solution to the latency time is to add acceleration modules to the client and the server. The acceleration modules may be implemented in either hardware or software. The acceleration module for the client includes a cache that holds requests received for the data. The acceleration module for the server includes prediction or read-ahead logic to determine other parts of the file that should be retrieved in the future based on the already received requests. Thus, when a first request is received, the acceleration module will attempt to predict the next request and begin to retrieve responsive data and send it to the cache of the acceleration module of the client. Once the first responsive data is received, the client will send the next request to the acceleration module for the client. The responsive data to the request is already stored in the cache of the client, thus eliminating the need for latency across the network for the second request to be sent to the client. However, if the prediction logic is inaccurate, the bandwidth of the network is unnecessarily used as well as consuming server resources in unnecessary data transfers and latency time is actually increased.

Thus, the read-ahead logic attempts to correctly predict offsets which when determined correctly achieve a performance gain. Ideally, large files may be sent sequentially and subsequent sequential blocks may be sent and thus accessed from the cache for the accelerator coupled to the client therefore minimizing the traffic and speeding performance. However, if the read-ahead logic is inaccurate as to the next requested data, the predictions impair performance by generating unnecessary input and output operations, generating unnecessary network traffic leading to blocking problems and wastefully occupying memory pages. Such a situation occurs when a data is not stored sequentially resulting in wasted resources by inaccurately predicting the next sequential block. For example, the first block in many files will contain a header with pointers to various locations in the sequence to fill in the file via data in different, non-linear locations in the file. Such files could not be accelerated because they are not requested sequentially.

SUMMARY

A method for read-ahead prediction of subsequent requests to send data between a client coupled to a server via a network includes receiving at a traffic management device a request for a part of at least one of a data file and metadata. The traffic management device selects from two or more of a sequential prediction engine, an expert prediction engine and a learning prediction engine to predict a read-ahead of the at least one of the data file and metadata. One or more additional read-ahead parts of the at least one of the data file and metadata are determined with the traffic management device based on the selecting.

A computer readable medium having stored thereon instructions for predicting a part of a data file and metadata to send to a requesting client over a network comprising machine executable code which when executed by at least one processor, causes the processor to perform steps including receiving a request for a part of at least one of a data file and metadata. A selection from two or more of a sequential prediction engine, an expert prediction engine and a learning prediction engine is made to predict a read-ahead of the at least one of the data file and metadata. One or more additional read-ahead parts of the at least one of the data file and metadata are determined based on the selecting.

A traffic management apparatus includes one or more processors, a memory coupled to the one or more processors by a bus, and a network interface controller coupled to the one or more processors and the memory and configured to be capable of receiving and forwarding data packets from a network that relate to a plurality of applications. At least one of the one or more processors configured to execute programmed instructions stored in the memory and a network interface controller with logic configured to receive a request for a part of at least one of a data file and metadata. A selection from two or more of a sequential prediction engine, an expert prediction engine and a learning prediction engine is made to predict a read-ahead of the at least one of the data file and metadata. One or more additional read-ahead parts of the at least one of the data file and metadata are determined based on the selecting.

DETAILED DESCRIPTION

Figure 1:
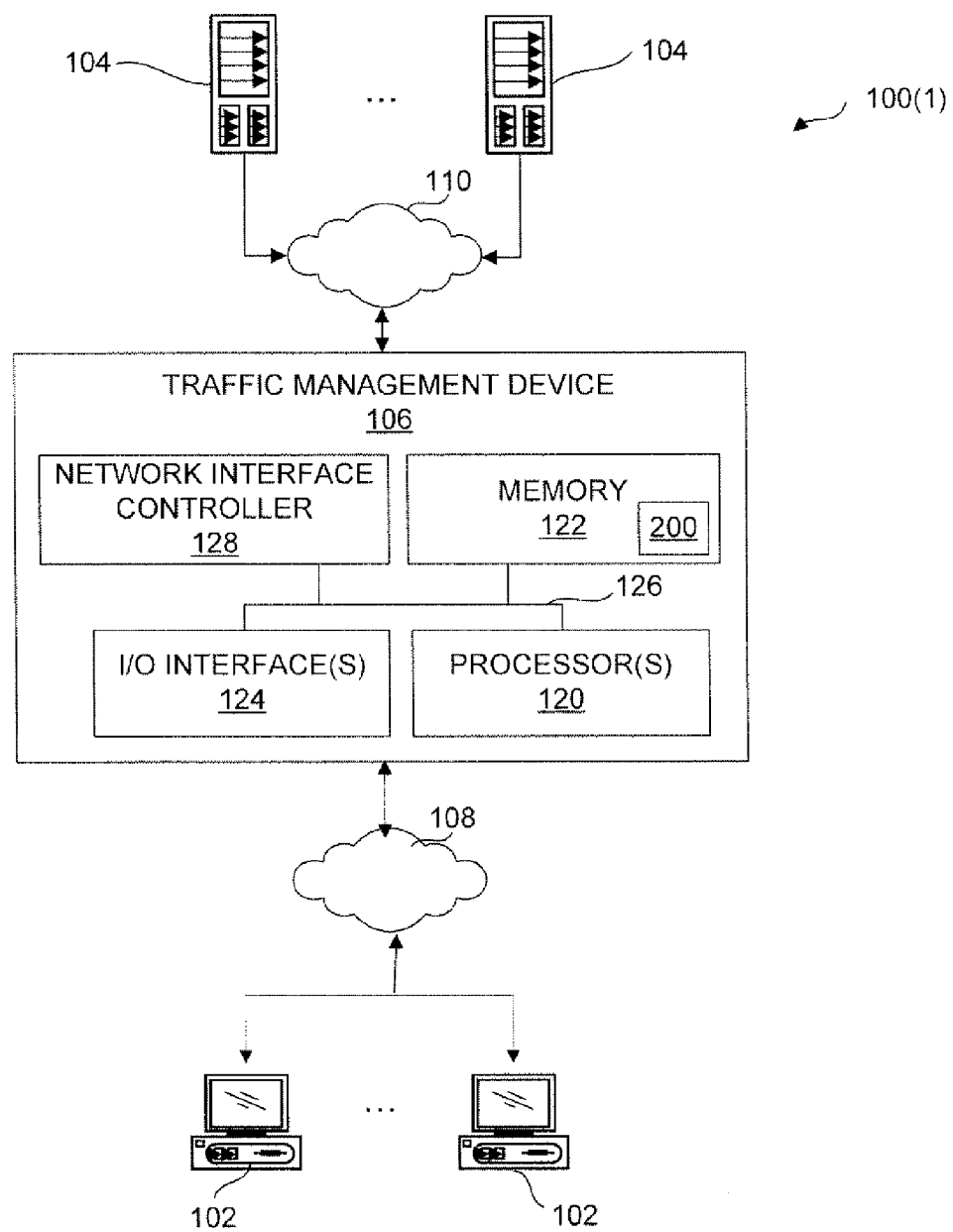
FIG. 1 is a diagram showing a network environment with an asymmetric deployment of a traffic management device using one example of a read-ahead predictive module.
Figure 2:
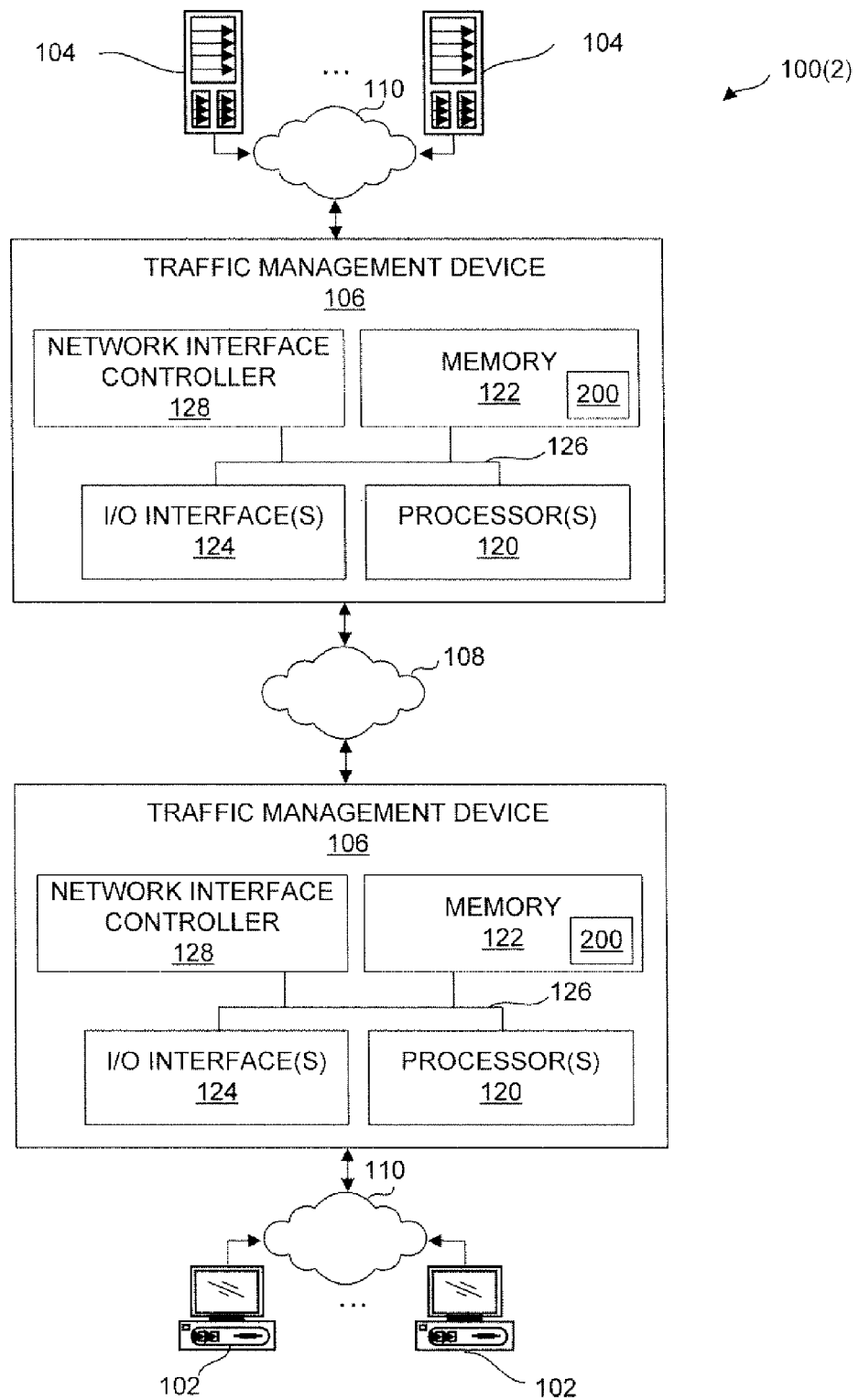
FIG. 2 is a diagram showing a network environment with an symmetric deployment of traffic management devices using one example of a read-ahead predictive module.

Referring to FIG. 1, an exemplary system 100(1) includes one or more servers 104, one or more client computers 102, and an traffic management device 106 (in an asymmetric deployment in system), which are coupled together by local area network (LAN) 110 and wide are network (WAN) network 108. Another exemplary system 100(2) with traffic management devices 106 in a symmetric deployment is illustrated in FIG. 2. While not shown, the systems 100(1) and 100(2) may include additional network components, such as routers, switches and other devices. Generally, servers 104 process requests received from requesting client computers 102 over LAN 110 and network 108 according to the HTTP-based application RFC protocol or the CIFS or NFS protocol in this example, but the principles discussed herein are not limited to this example and can include other application protocols. In systems 100(1) and 100(2), traffic management device 106 is coupled to the servers 104 through LAN 110, although the servers and traffic management device may be coupled together via other topologies. The traffic management device 106 also is coupled to the client computers 102 through the WAN 108 in the asymmetric deployment in system 100(1) shown in FIG. 1 for example, which may comprise any wide area network (e.g., Internet) or any other type of network topology. LAN 104 may employ any suitable interface mechanisms and communications technologies including, for example, telecommunications in any suitable form (e.g., voice, modem, and the like), Public Switched Telephone Network (PSTNs), Ethernet-based Packet Data Networks (PDNs), combinations thereof, and the like. In the symmetric deployment shown in FIG. 2, the traffic management devices 106 are coupled through the network 108 and one of the traffic management devices 106 is coupled to the client computers 102 through LAN 104, in this example. The client computers 102, in this example, may run interface applications such as Web browsers that may provide an interface to make requests for and send data to different web server based applications via the network 108. A series of applications may run on the servers 104 that allow the transmission of data, such as a data file or metadata, requested by the client computers 102. The servers 104 may provide data or receive data in response to requests directed toward the respective applications on the servers 104 from the client computers 102. As per TCP, packets may be sent to the servers 104 from the requesting client computers 102 to send data. It is to be understood that the servers 104 may be hardware or software or may represent a system with multiple servers 104, which may include internal or external networks. In this example the servers 104 may be any version of Microsoft® IIS servers or Apache® servers, although other types of servers may be used. Further, additional servers may be coupled to the LAN 110 and many different types of applications may be available on servers coupled to the LAN 110.

The traffic management devices 106 may include a network interface controller ("NIC") 126 to transmit and receive data packets from network 108 and the LAN 110. Various network processing applications, such as CIFS applications, NFS applications, HTTP Web Server applications, FTP applications, may be operating on servers 104 and transmitting data (e.g., files, Web pages) through the traffic management device 106 to client computers 102 responsive to requests from those clients. It is to be understood that the NIC 128 may take the form of a network peripheral card that is installed inside a bus interface within traffic management device 106 or may be an embedded component as part of a computer processor motherboard, a router or printer interface, or a USB device that may be internal or external to the traffic management device 106.

In this example, the traffic management device 106 runs one or more traffic management applications on one or more processors 120 to manage network traffic by optimizing, securing and accelerating the traffic between client computers 102 and servers 104, for example, although the traffic management device 106 may perform other network related functions, such as establishing virtual private networks. Moreover, the network traffic managed by the traffic management device 106 may be received and transmitted by traffic management device 106 from and to the LAN 110 and network 108 in the form of network data packets in the TCP/IP protocol, although the network data packets could be in other network protocols.

Traffic management devices 106 include the NIC 128, I/O interface(s) 124, memory 122, and processor(s) 120 which are coupled together by bus 126. Although the traffic management device 106 is shown in FIG. 1 in this example as being a standalone device, such as a BIG-IP® traffic management device offered by F5 Networks, Inc., of Seattle, Wash., it should be appreciated that the traffic management device 106 could also be one of several blades servers coupled to a chassis device, such as a VIPRION® traffic management device, also offered by F5 Networks, Inc., of Seattle, Wash.

NIC 128 may comprise specialized hardware to achieve maximum execution speeds, such a field programmable gate arrays ("FPGAs"), although other hardware and/or software may be used, such as ASICs, field programmable logic devices ("FPLDs"), programmable logic units ("PLUs"), software executed by the processor 120, and combinations thereof. The use of the specialized hardware in this example, however, allows the NIC 128 and/or the processor 120 executing programmed instructions stored in memory 122 to efficiently read-ahead to maximize efficiencies of remotely transferring data, as will be described in further detail below.

The bus 126 is a hyper-transport bus in this example, although other bus types may be used, such as PCI. Input/output interfaces 124 include one or more keyboard/mouse interfaces, display devices interfaces, and other physical and/or logical mechanisms for enabling traffic management devices 106 to communicate with the outside environment, which includes network 108, LAN 110 and users (e.g., administrators) desiring to interact with traffic management devices 106, such as to configure, program or operate it.

Processor(s) 120 executes the traffic management applications that handle the network traffic between applications on the client computers 102 and servers 104 being managed by traffic management devices 106, as mentioned earlier, as well as one or more computer-executable instructions stored in the memory 122, as well as other operations as mentioned herein. The processor(s) 120 may comprise one or more central processing units ("CPUs") or general purpose processors with one or more processing cores, such as AMD® processor(s), although other types of processor(s) could be used (e.g., Intel®).

Figure 4:
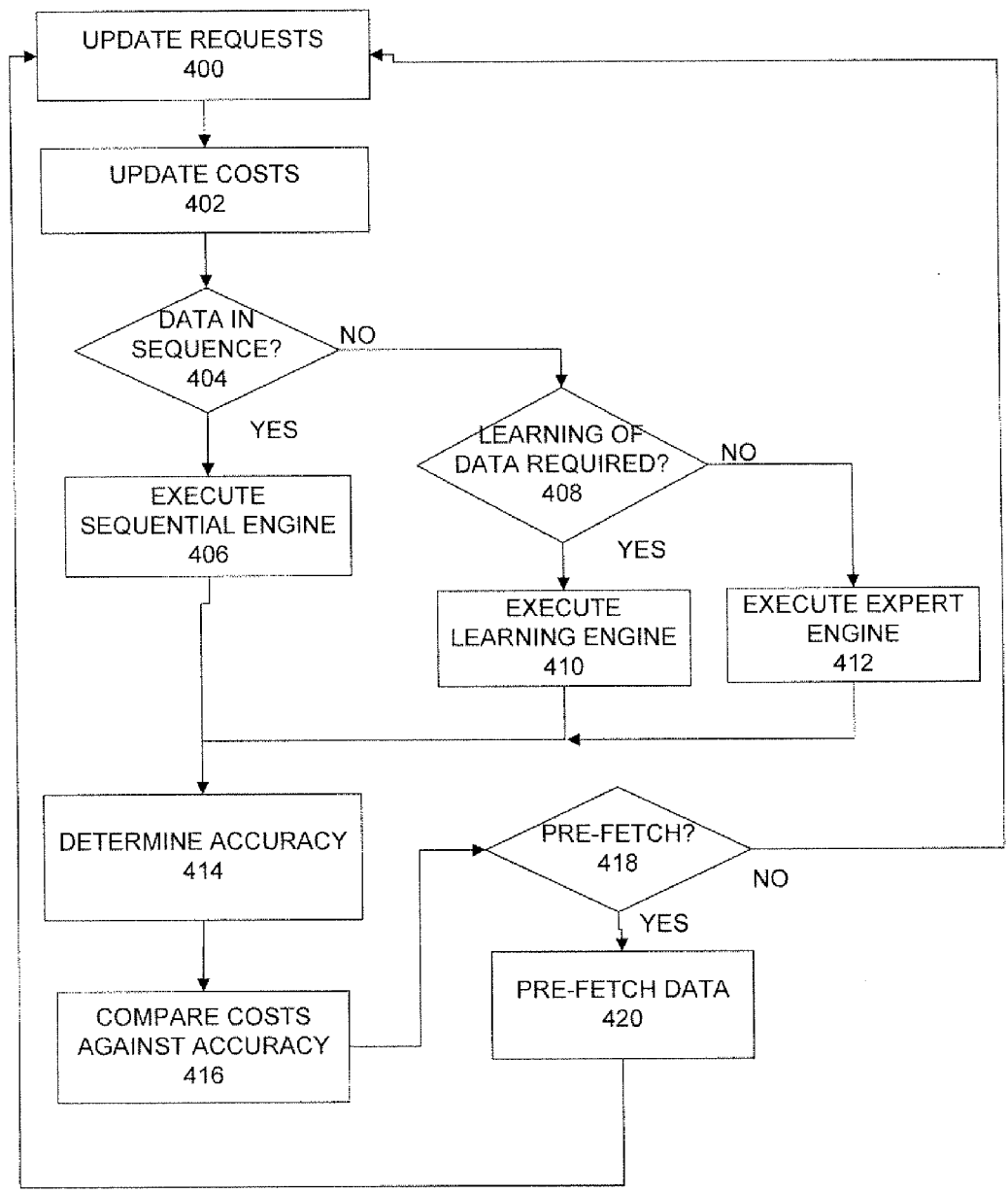
FIG. 4 is a flow chart of an exemplary method for efficient read-ahead to maximize efficiencies of remotely transferring data.
Figure 5:
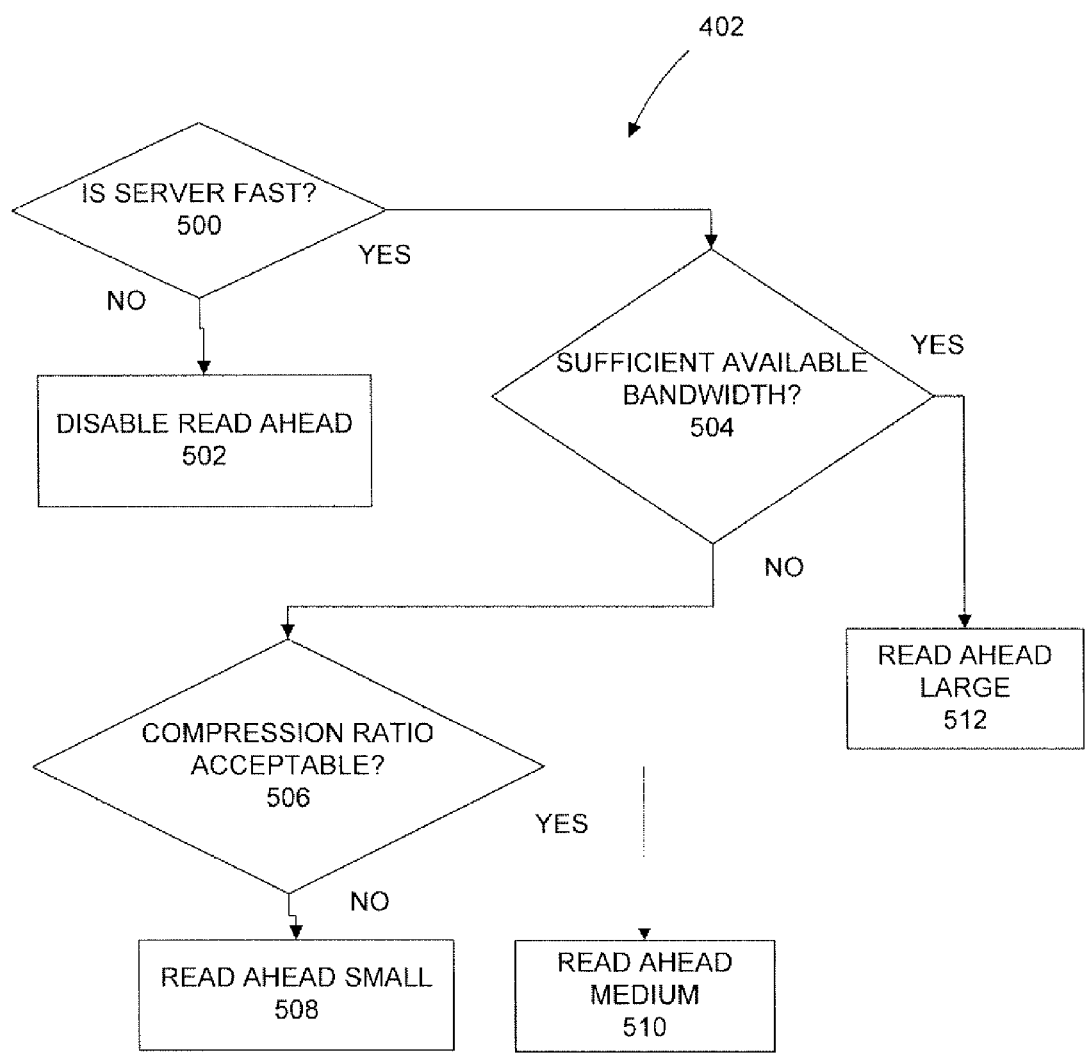
FIG. 5 is a flow chart an exemplary method for analyzing costs to determine a level of read-ahead.

Memory 122 may comprise one or more tangible storage media such as, for example, RAM, ROM, flash memory, CD-ROM, floppy disk, hard disk drive(s), solid state memory, DVD, or any other memory storage type or devices, including combinations thereof, which are known to those of ordinary skill in the art. In this example, memory 122 also includes read-ahead predictive module 200 as illustrated in greater detail with reference to FIG. 3. Further, memory 122 stores one or more computer-readable instructions that may be executed by the one or more host system processor(s) 120 and/or the NIC 128. When these stored instructions are executed, they may implement processes that are illustrated, for exemplary purposes only, by the flow chart diagrams shown in FIGS. 4 and 5. It should be appreciated that the flow chart diagrams shown in FIGS. 4 and 5 are representative of example steps or actions that may be embodied or expressed as one or more computer or machine readable instructions that may be executed by the NIC 128 and/or the processor(s) 120 in traffic management devices 106 shown in FIGS. 1 and 2. In this example, the machine readable instructions may embody an algorithm or computer program for execution by at least one of: (a) one or more processors each having one or more processor cores, (b) hardware specifically configured to perform the instructions (e.g., ASICs, FPGAs) and (c) one or more other suitable processing device(s). The algorithm or computer program may be embodied in software stored on memory 122, for example.

Figure 3:
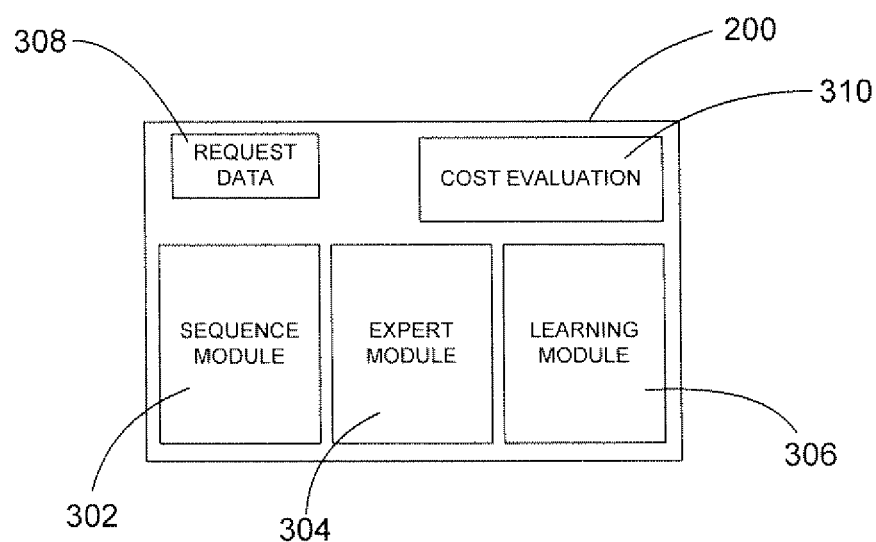
FIG. 3 is a block diagram of the read-ahead predictive module that may be executed on traffic management devices in FIGS. 1 and 2.

Referring to FIG. 3, the read-ahead predictive module 200 may include a sequential engine 302, an expert engine 304, and a learning engine 306 which each may be employed to predict future data to send based on previous requests to the server 104. The predictive module 200 may also include a request history memory 308 and a cost evaluation engine 310. The read-ahead predictive module 200 may receive performance data, such as compression ratio, network feedback (congestion), and bandwidth delay product (which is the available bandwidth times the round trip transit time) from the network 108 as well as performance data, such as performance speed of the servers 104. As will be explained, the performance data may be used by the predictive module 200 to determine the costs of the read-ahead module 200 to determine the optimal read-ahead procedure to minimize latency in the network 108. The request history memory 308 may store data regarding the requests which may be used by the engines 302, 304, and 306 to make the predictions.

The simplest case for prediction may be with data that is stored sequentially or in a linear order. The sequential engine 302 may be programmed with instructions or logic to select the next part or block of data when a sequentially or in a linear order with the data is determined.

The expert engine 304 may be programmed with instructions or logic to apply rules to identify a file or metadata type or types and then determine the order of the next part of the data file or metadata based on that identification. The expert engine 304 thus may understand an underlying data file or metadata format and may determine the next part by decoding this format. For example, the expert engine 304 may be directed to read various headers in the data file or metadata format to draw the next part from different locations in the data file or metadata.

The learning engine 306 may be programmed with instructions or logic to adapt to previously received data for non-linearly or non-sequentially organized data files based on learning tools, such as statistical analysis. The learning engine 306 learns and optimizes its performance for further predictions by analyzing the file access pattern on a first access and for subsequent accesses, but requires more memory and resources. The learning engine 306 may be preprogrammed with various predetermined rules similar to that of an expert engine, such as the expert engine 304, to increase efficiency.

Persons of ordinary skill in the art will readily appreciate that the entire algorithm or computer program, and/or parts thereof, could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the NIC 128, traffic management devices 106, or even the client computers 102 and servers 104, could be implemented by software, hardware, and/or firmware (and combinations thereof). Further, although the example algorithm is described with reference to the flowcharts illustrated in FIGS. 4 and 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Each of the client computers 102, servers 104, and traffic management devices 106 may include a central processing unit (CPU), controller or processor, a memory, and an interface system that are coupled together by a bus or other link, although other numbers and types of each of the components and other configurations and locations for the components can be used. The processors in the client computers 102, servers 104, and traffic management devices 106 may execute a program of stored instructions for one or more aspects of the methods and systems as described and illustrated herein, including for efficient read-aheads to maximize efficiencies of remotely transferring data, although the processor could execute other types of programmed instructions. The memory may store these programmed instructions for one or more aspects of the methods and systems as described and illustrated herein, including the method for efficient read-aheads to maximize efficiencies of remotely transferring data, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the client computers 102, servers 104, and traffic management devices 106 are described and illustrated herein in connection with FIGS. 1-2, each of the computers of the systems 100(1) and 100(2) could be implemented on any suitable computer system or computing device. It is to be understood that the example devices and systems of the system 100 are for exemplary purposes, as many variations of the specific hardware and software used to implement the systems 100(1) and 100(2) are possible, as will be appreciated by those skilled in the relevant art(s).

Furthermore, each of the devices of the systems 100(1) and 100(2) may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

In addition, two or more computing systems or devices may be substituted for any one of the systems in the systems 100(1) and 100(2). Accordingly, principles and advantages of distributed processing, such as redundancy, replication, and the like, also can be implemented, as desired, to increase the robustness and performance of the devices and systems of the systems 100(1) and 100(2). The systems 100(1) and 100(2) may also be implemented on a computer system or systems that extend(s) across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The operation of the example read-ahead predictive module 200 which may run on traffic management device 106 in the asymmetric deployment will now be described with reference to FIG. 1 in conjunction with the flow diagram shown in FIG. 4. The operation in the symmetric deployment shown in FIG. 2 is the same, except as illustrated and described herein.

In step 400, data requests are received by traffic management device 106 from one of the client computers 102, although other systems and devices could make the data requests. Once received, the traffic management device 106 updates the request history memory 308 based on these data requests, although the history could be updated and stored in other locations.

In step 402, the traffic management device 106 may use the cost evaluation engine 310 to update and analyze costs or other factors for the system 100(1) or 100(2), such as server response time, available bandwidth, and compression ratio, by way of example, to determine a level of read-ahead, although other types and numbers of costs or factors could be considered. An example of the cost evaluation engine that may be used in step 402 is illustrated and discussed in greater detail below with reference to FIG. 5.

Referring back to FIG. 4, in step 404 traffic management device 106 determines whether the requested data file or metadata is organized sequentially or linearly. If in step 404, the traffic management device 106 determines the requested data file or metadata is arranged in sequential blocks, then the Yes branch is taken to step 406. In step 406, the sequential engine 302 is implemented and selects the next parts or blocks of the data file or metadata for a prefetch based on the knowledge the requested data file or metadata is sequential or linear. If however, in step 404 the traffic management device 106 determines the requested data file or metadata is not arranged in sequential parts or blocks, then the No branch is taken to step 408.

In step 408, the traffic management device determines with the learning engine 306 whether the data file or metadata may be learned. This determination process may include determining whether the request is the first pass or the second pass for the data file. If the request is the second pass, then the learning engine 306 may use data from the first pass to refine its prediction for the next part or block of the data file or metadata. If in step 408 the traffic management device determines the data file or metadata may be learned, then the Yes branch is taken to step 410 where the learning engine 306 is implemented. The learning engine 306 will revise its stored model based on the historical requests and make predictions to send the next part or block of the data file or metadata from the responding one of the servers 104 in this example.

If in step 408 the traffic management device determines the data file or metadata may not be learned, then the No branch is taken to step 412 where the expert module 304 is implemented. The expert engine 304 may identify the file or meta-data type or types for the data requests and then determine the next parts of the data file or metadata based on that identification, although the expert engine may identify the next parts in other manners.

In step 414, the traffic management device 106 determines the probability of accuracy of the predictions or determinations obtained from the selected engine 302, 304 and 306, although other manners for computing the accuracy or confidence in the predictions can be used. By way of example, the selection of the sequential engine could indicate a data request for a sequential data file or metadata and thus a high probably of confidence for a prefetch, such as 100%. In another example, the selection of the expert engine could indicate some identification and familiarity with a format of the data file or metadata in the request and thus a medium probability of confidence for a prefetch, such as 60%. In yet another example, the selection of the learning engine with a limited number of prior requests for that particular data file or metadata could indicate a low probability of confidence for a prefetch, such as 30%, although this percentage can increase with greater stored knowledge from prior requests and exceed the accuracy of the expert engine.

In step 416, the traffic management device 106 compares the determined level of read-ahead from the computed costs against the determined probability of accuracy to determine if a prefetch of one or more subsequent parts of the data file or metadata should occur, although other types of comparisons and analysis could be performed. By way of example only, a determination from the computed costs of a more aggressive prefetch approach, such as a read-ahead large, could have a low probability of accuracy threshold. As a result, if the determined probability of accuracy in step 414 exceeded this stored low probability of accuracy threshold a prefetch could occur based on the determined read-ahead level. In another example, a determination from the computed costs of a non-aggressive read-ahead, such as a read-ahead small, could have a high probability of accuracy threshold. As a result, if the determined probability of accuracy in step 414 exceeded this stored high probability of accuracy threshold a prefetch could occur based on the determined read-ahead level. The traffic management device 106 may store tables with these different thresholds that must be met for a prefetch to occur when making this comparison.

In 418, the traffic management device 106 determines whether to prefetch the selected data file or metadata based on the comparison in step 416. If in step 418 the traffic management device 106 determines there should not be a prefetch based on the results of the comparison in step 416, then the No branch is taken, the prefetch is not executed, the process may wait a prescribed period of time, and this process may either stop or eventually loop back to step 400 described earlier. If however in step 418, the traffic management device 106 determines there should be a prefetch based on the results of the comparison in step 416, then the Yes branch is taken to step 420.

In step 420, the traffic management device 106 prefetches and sends subsequent parts of the data file or metadata based on the determined level of read to cache or other memory storage at the requesting one of the client computers 102 prior to another request, although this next portion of the data file or metadata could be stored at other locations. For example, in the symmetric deployment illustrated in FIG. 2, these subsequent parts of the data file or metadata could be stored in cache or other memory storage at the traffic management device 106 adjacent the client computers 102. When the next request is made by the requesting one of the client computers 102, then this part of the data file or metadata can be quickly returned from the cache or other memory storage in the requesting one of the client computers 102 in FIG. 1 or the adjacent traffic management device 106 in FIG. 2 if responsive to the request. Once step 420 is completed, this method returns to step 400 as described earlier. By iterating the requests through the process above, the engines 302, 304 and 306 become more accurate with respect to the predictions of subsequent parts or blocks of the data file or metadata.

Referring to FIG. 5, an example of the cost evaluation engine 310 that may be used in step 402 above is illustrated. As discussed earlier, the cost variables which are updated and analyzed in this example are server performance, available wide area network bandwidth, and compression ratio, although other types of costs and factors can be used. The server performance is the server response time that may indicate the speed of response of the servers 104 in this example in FIGS. 1 and 2. The available wide area network bandwidth is a measure of available bandwidth on the network 108 in the examples illustrated in FIGS. 1 and 2. The compression ratio is the percentage of the network 108 in the examples illustrated in FIGS. 1 and 2 that is occupied by the transmission of data.

Additionally in this example the possible levels of read-ahead comprise: read-ahead disabled; read-ahead small; read-ahead medium; and read-ahead large, although other numbers and types of stored read-ahead levels could be used. In this particular example, these read-aheads become progressively larger from read-ahead disabled to read-ahead large. The level of read-ahead is large or maximally aggressive when all of the costs or factors are favorable, thus resulting in a maximum amount of prefetched data determined by traffic management device 106 being sent over the network 108. However, the aggressiveness may be adjusted downward if one or more of the factors are high indicating that a read-ahead large may be undesirable In step 500, traffic management device 106 first determines whether the performance of the responding one of the servers 104 is sufficiently fast, for example above a certain stored performance threshold. If in step 500 the performance of the responding one of the servers 104 is determined not to be sufficiently fast, then the No branch is taken to step 502 where the read-ahead is disabled since the responding one of the servers 104 is limited in response time and no advantage may be gained by read-ahead. If in step 500 the performance of the responding one of the servers 104 is determined to be fast, then the Yes branch is taken to step 504.

In step 504, traffic management device 106 determines in this example if there is sufficient available bandwidth on the network 108, for example above a certain stored available bandwidth threshold. If in step traffic management device 106 determines there is sufficient available bandwidth on the network 108, then the Yes branch is taken to step 512. In step 512, traffic management device 106 sets the read-ahead for the maximum or most aggressive read-ahead or read-ahead large. If however in step 504 the traffic management device 106 determines there is not sufficient available bandwidth on the network 108, then the No branch is taken to step 506.

In step 506, traffic management device 106 determines a compression ratio of the network 108 and whether the determined compression ratio is acceptable, for example below a stored threshold percentage. If in step 506, traffic management device 106 determines the compression ratio is not acceptable, then the No branch is taken to step 508. In step 508 traffic management device 106 sets the read-ahead to the read-ahead small. If however in step 506, traffic management device 106 determines the compression ratio is acceptable, then the Yes branch is taken to step 510. In step 510, traffic management device 106 sets the read-ahead to a read-ahead medium, that is a stored read-ahead rate between read-ahead small and read-ahead large.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for read-ahead prediction of subsequent requests to send data between a client coupled to a server via a network, the method comprising:

receiving at a traffic management device a request for a part of at least one of a data file or a metadata from a client computing device;

selecting with the traffic management device from two or more of a sequential prediction engine, an expert prediction engine and a learning prediction engine to predict a read-ahead of the at least one of the data file or the metadata;

determining with the traffic management device one or more additional read-ahead parts of the at least one of the data file or metadata based on the selection; and prefetching and sending with the traffic management device the determined one or more additional read-ahead parts of the at least one of the data file or metadata to the client computing device prior to receiving another request.

2. The method of claim 1 further comprising:

determining with the traffic management device a level of read-ahead aggressiveness based on one or more costs associated with the prefetching and sending;

determining with the traffic management device a historical accuracy with the prefetching and sending based on the selecting; and determining with the traffic management device whether to execute the prefetching and sending based on a comparison of the determined level of read-ahead aggressiveness against the determined historical accuracy.

3. The method of claim 2 wherein the one or more costs comprise available bandwidth, server performance, and compression ratio.

4. The method of claim 1 wherein the selecting from two or more of the sequential prediction engine, the expert prediction engine or the learning prediction engine with the traffic management device is based on evaluating the at least one of the data file or the metadata according to at least one of a set of factors.

5. The method of claim 4 wherein the factors comprise whether the at least one of the data file the metadata is sequentially or non-sequentially accessed, whether learning of the at least one of the data file or the metadata is required, or whether one or more stored read-ahead rules exist for a format of the at least one of the data file or the metadata.

6. The method of claim 1 wherein the expert prediction engine bases predicts the another part of the at least one of the data file or metadata based on a format of the at least one of the data file or the metadata.

7. The method in claim 1 wherein the learning prediction engine predicts the another part of the at least one of the data file or the metadata based on one or more previous requests for the at least one of the data file or the metadata.

8. A non-transitory computer readable medium having stored thereon instructions for predicting a part of a data file and metadata to send to a requesting client over a network comprising machine executable code which when executed by at least one processor, causes the processor to perform steps comprising:

receiving a request for a part of at least one of a data file or a metadata from a client computing device;

selecting from two or more of a sequential prediction engine, an expert prediction engine or a learning prediction engine to predict a read-ahead of the at least one of the data file or the metadata;

determining one or more additional read-ahead parts of the at least one of the data file or the metadata based on the selection; and prefetching and sending the determined one or more additional read-ahead parts of the at least one of the data file or the metadata to the client computing device prior to receiving another request.

9. The medium of claim 8 further comprising:

determining a level of read-ahead aggressiveness based on one or more costs associated with the prefetching and sending;

determining a historical accuracy with the prefetching and sending based on the selecting; and determining whether to execute the prefetching and sending based on a comparison of the determined level of read-ahead aggressiveness against the determined historical accuracy.

10. The medium of claim 9 wherein the one or more costs comprise available bandwidth, server performance, and compression ratio.

11. The medium of claim 8 wherein the selecting from two or more of the sequential prediction engine, the expert prediction engine or the learning prediction engine with a traffic management device is based on evaluating the at least one of the data file or the metadata according to at least one of a set of factors.

12. The medium of claim 11 wherein the factors comprise whether the at least one of the data file or the metadata is sequentially or non-sequentially accessed, whether learning of the at least one of the data file or the metadata is required, and whether one or more stored read-ahead rules exist for a format of the at least one of the data file or the metadata.

13. The medium of claim 8 wherein the expert prediction engine bases predicts the another part of the at least one of the data file or the metadata based on a format of the at least one of the data file or the metadata.

14. The medium in claim 8 wherein the learning prediction engine predicts the another part of the at least one of the data file or the metadata based on one or more previous requests for the at least one of the data file and or the metadata.

15. A traffic management apparatus comprising:

one or more processors;

a memory coupled to the one or more processors by a bus; and a network interface controller coupled to the one or more processors and the memory and configured to be capable of receiving and forwarding data packets from a network that relate to a plurality of applications;

at least one of the one or more processors configured to execute programmed instructions stored in the memory and a network interface controller with logic configured to implement:

receiving a request for a part of at least one of a data file or a metadata from a client computing device;

selecting from two or more of a sequential prediction engine, an expert prediction engine or a learning prediction engine to predict a read-ahead of the at least one of the data file or the metadata;

determining one or more additional read-ahead parts of the at least one of the data file or the metadata based on the selection; and prefetching and sending the determined one or more additional read-ahead parts of the at least one of the data file or the metadata to the client computing device prior to receiving another request.

16. The apparatus of claim 15 wherein the at least one of the one or more processors configured to execute programmed instructions stored in the memory and a network interface controller with logic configured to further implement:

determining a level of read-ahead aggressiveness based on one or more costs associated with the prefetching and sending;

determining a historical accuracy with the prefetching and sending based on the selecting; and determining whether to execute the prefetching and sending based on a comparison of the determined level of read-ahead aggressiveness against the determined historical accuracy.

17. The apparatus of claim 16 wherein the one or more costs comprise available bandwidth, server performance, and compression ratio.

18. The apparatus of claim 15 wherein the selecting from two or more of the sequential prediction engine, the expert prediction engine or the learning prediction engine with the traffic management device is based on evaluating the at least one of the data file or the metadata according to at least one of a set of factors.

19. The apparatus of claim 18 wherein the factors comprise whether the at least one of the data file and metadata is sequentially or non-sequentially accessed, whether learning of the at least one of the data file or the metadata is required, and whether one or more stored read-ahead rules exist for a format of the at least one of the data file or the metadata.

20. The apparatus of claim 15 wherein the expert prediction engine bases predicts the another part of the at least one of the data file or the metadata based on a format of the at least one of the data file or the metadata.

21. The apparatus in claim 15 wherein the learning prediction engine predicts the another part of the at least one of the data file or the metadata based on one or more previous requests for the at least one of the data file or the metadata.

* * * * *